(12) United States Patent
Backes

(10) Patent No.: US 9,733,762 B2
(45) Date of Patent: Aug. 15, 2017

(54) OPTICAL DISPLAY AND CONTROL ELEMENT AND METHOD OF OPTICALLY DETERMINING A POSITION

(75) Inventor: Ulrich Backes, Radolfzell (DE)

(73) Assignee: TRW Automotive Electronics & Components GmbH (DE)

( * ) Notice: Subject to any disclaimer, the term of this patent is extended or adjusted under 35 U.S.C. 154(b) by 983 days.

(21) Appl. No.: 13/471,499

(22) Filed: May 15, 2012

(65) Prior Publication Data

US 2012/0293462 A1    Nov. 22, 2012

(30) Foreign Application Priority Data

May 17, 2011 (DE) ........................ 10 2011 101 782

(51) Int. Cl.
*G06F 3/042* (2006.01)
*G09G 5/10* (2006.01)

(52) U.S. Cl.
CPC ............ *G06F 3/0425* (2013.01); *G06F 3/042* (2013.01); *G09G 5/10* (2013.01)

(58) Field of Classification Search
CPC ......... G06F 3/0425; G06F 3/005; G06F 3/007
USPC ....... 345/173–175; 340/425.5; 382/162–203, 382/212–216
See application file for complete search history.

(56) References Cited

U.S. PATENT DOCUMENTS

| | | | | |
|---|---|---|---|---|
| 7,379,562 B2* | 5/2008 | Wilson | ................... | G06F 3/0425 356/4.07 |
| 7,432,917 B2* | 10/2008 | Wilson | ................... | G06F 3/0418 345/173 |
| 7,525,538 B2* | 4/2009 | Bathiche | ................ | G02B 5/282 345/175 |
| 7,626,578 B2* | 12/2009 | Wilson | ................... | G06F 3/0418 345/173 |
| 8,125,449 B2* | 2/2012 | Liao | ...................... | G06F 3/0317 345/158 |
| 8,416,256 B2* | 4/2013 | Neal | ..................... | G09G 3/2055 345/547 |
| 8,508,506 B2* | 8/2013 | Onishi | ................... | G06F 3/0412 178/18.09 |

(Continued)

FOREIGN PATENT DOCUMENTS

| | | |
|---|---|---|
| CN | 101882012 | 11/2010 |
| CN | 102023764 | 4/2011 |
| WO | 2008/073289 | 6/2008 |

*Primary Examiner* — Vinh Lam
(74) *Attorney, Agent, or Firm* — Tarolli, Sundheim, Covell & Tummino LLP

(57) ABSTRACT

An optical display and control element comprises an at least partially transparent display screen, at least one light source for illuminating a rear side of the display screen, and at least one light sensor for detecting a temporal signal of the light scattered on the display screen. The light source is able to produce a time-variable light pattern while illuminating the rear side of the display screen. A control and processing unit is able to evaluate the temporal signal, detected by the light sensor, in combination with the time-variable light pattern and to determine a position of at least one object located on the display screen from this evaluation. The invention further relates to a method of optically determining the position of an object which is located on an at least partially transparent display screen of an optical display and control element.

13 Claims, 4 Drawing Sheets

(56) References Cited

U.S. PATENT DOCUMENTS

| | | | |
|---|---|---|---|
| 2005/0226505 A1* | 10/2005 | Wilson | G06F 3/0425 382/180 |
| 2006/0007170 A1* | 1/2006 | Wilson | G06F 3/0418 345/173 |
| 2006/0289760 A1* | 12/2006 | Bathiche | G02B 5/282 250/332 |
| 2008/0192026 A1* | 8/2008 | MacKey | G06F 3/042 345/174 |
| 2009/0295744 A1* | 12/2009 | Onishi | G06F 3/0412 345/173 |
| 2010/0001962 A1* | 1/2010 | Doray | G06F 3/0317 345/173 |
| 2010/0001963 A1* | 1/2010 | Doray | G06F 3/03545 345/173 |
| 2010/0182137 A1 | 7/2010 | Pryor | |
| 2010/0201812 A1* | 8/2010 | McGibney | G06F 3/0416 348/143 |
| 2010/0225581 A1* | 9/2010 | Kiyose | G06F 3/0428 345/157 |
| 2010/0225616 A1* | 9/2010 | Kiyose | G06F 3/0412 345/175 |
| 2011/0062316 A1* | 3/2011 | Kiyose | G06F 3/0428 250/221 |
| 2011/0095995 A1 | 4/2011 | Dassanayake et al. | |

* cited by examiner

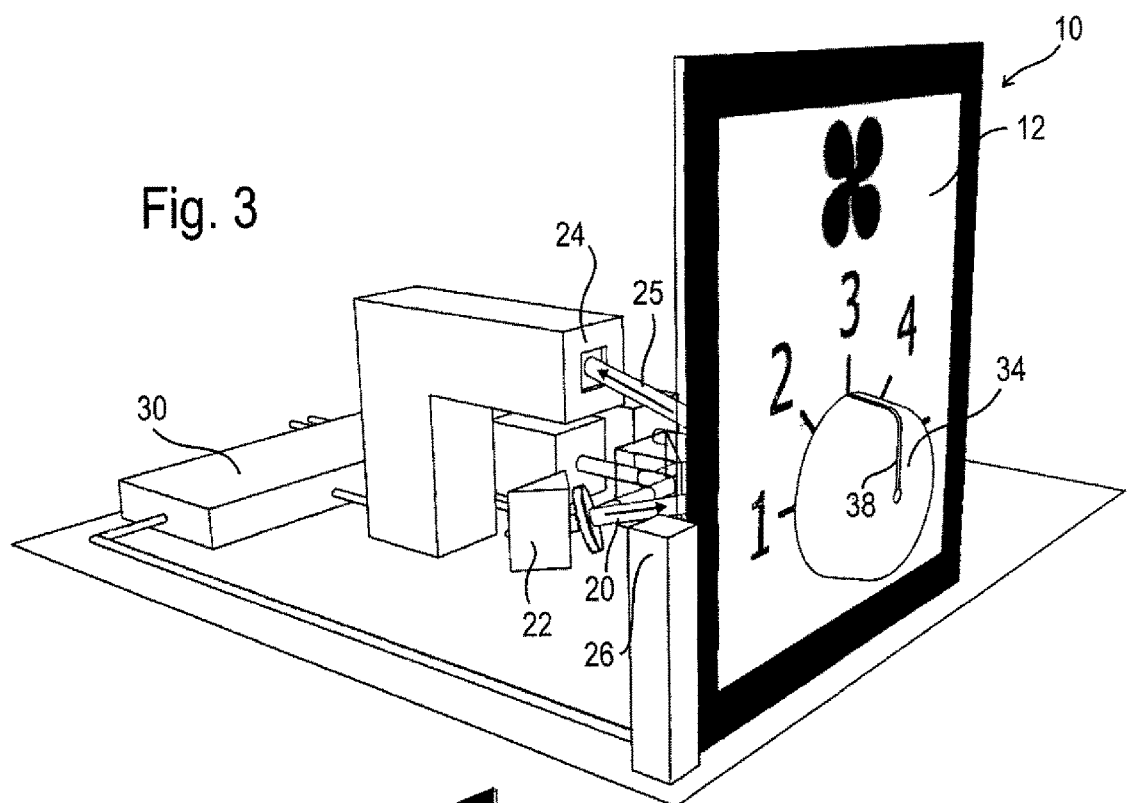
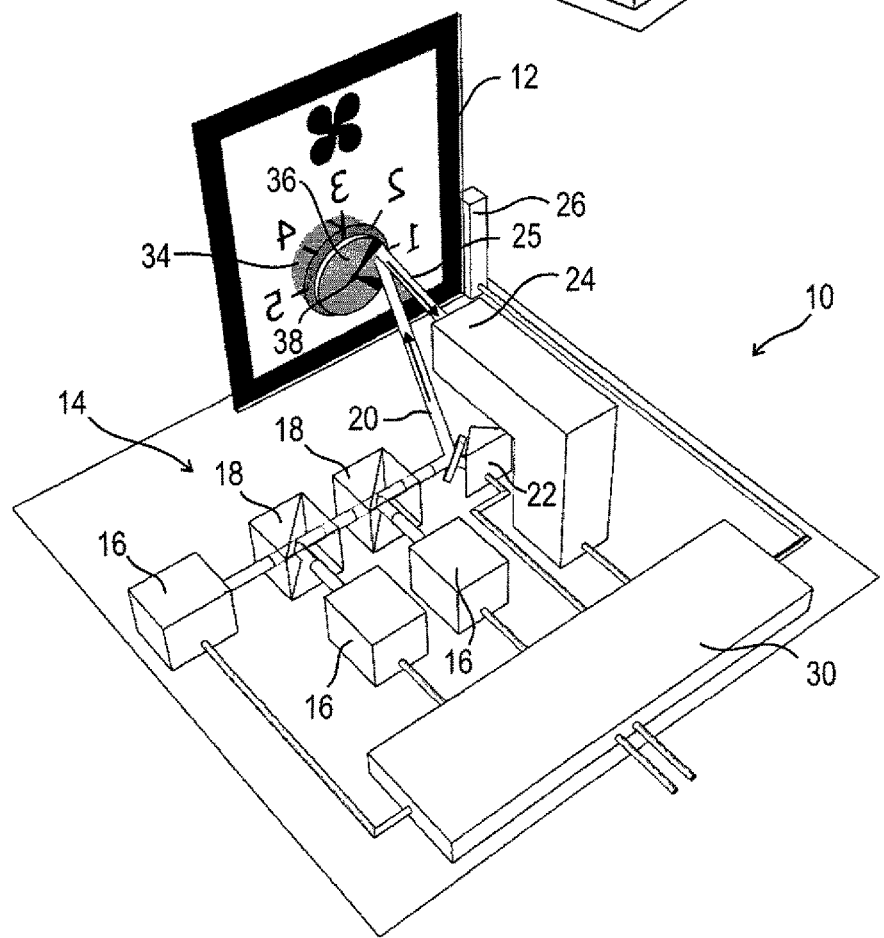

OPTICAL DISPLAY AND CONTROL ELEMENT AND METHOD OF OPTICALLY DETERMINING A POSITION

BACKGROUND OF THE INVENTION

The invention relates to an optical display and control element comprising an at least partially transparent display screen, at least one light source for illuminating a rear side of the display screen, and at least one light sensor for detecting a temporal signal of the light scattered on the display screen. Further, the invention relates to a method of optically determining a position of an object which is located on an at least partially transparent display screen of an optical display and control element.

A generic optical display and control element is known from US 2010/0182137 A1. A transparent display screen is illuminated on its rear side by a projector. A video camera is provided which is directed to the rear side of the display screen and is able to capture an image of the rear side of the display screen. By way of analyzing the two-dimensional image data, the position of e.g. a finger or pointing device on the display screen can be determined in order to facilitate a touch screen function. Detecting and analyzing the two-dimensional image data is elaborate.

SUMMARY OF THE INVENTION

It is the object of the invention to provide an optical display and control element which can be manufactured in a simple way and therefore at low cost and allows to determine a position of an object located on the display screen.

It is further the object of the invention to provide an advantageous method of optically determining a position.

This object is achieved by a generic optical display and control element, the light source being designed so as to be able to produce a time-variable light pattern while illuminating the rear side of the display screen, and a control and processing unit being provided which is designed so as to be able to evaluate the temporal signal, detected by the light sensor, in combination with the time-variable light pattern and to determine a position of at least one object located on the display screen from this evaluation. This allows a determination of the position due to the temporal information, whereby an elaborate image detection and identification is not required.

As an example, a deflection unit can provided which allows scanning the display screen by a light beam of the light source for producing the time-variable light pattern.

It is also possible that the light source is designed so as to be able to illuminate the display screen with a temporal sequence of different areal light patterns, in particular brightness patterns, for producing the time-variable light pattern. The temporal sequence of the areal light patterns advantageously comprises at least one set of light patterns, the set of light patterns comprising temporally successive light patterns which allow an iterative determination of the position.

Due to the reproduction effect, the temporal sequence of the areal light patterns can proceed so fast, preferably with successive complementary light patterns, that the individual light patterns can not be perceived with the naked eye, in particular at least 16 light patterns per second.

Preferably, the light source is designed for illuminating the display screen with a displayed image, the latter being modulated with an areal or time-variable light pattern.

The time-variable light patterns can be produced independently of a visible display rear projection if the light source is an infrared light source.

Alternatively, the light source is capable of producing visible light, allowing the visible display rear projection and producing the time-variable light pattern by a common light source.

A particularly flexible operation of the optical display and control element is made possible by the optical display and control element being a touch screen. In this case, the object to be determined on the display screen is a finger or pointing device.

It is also possible that an actuating element is provided which is attached to the display screen, the actuating element having its side facing the light source provided with an optical coding which codes a position of the actuating element. This allows, for instance, an optical identification of the position of a switch.

The actuating element may comprise an integrated light conductor which can be illuminated by the light source. This allows illuminating the actuating element in a simple manner.

At least one light sensor is arranged, for instance, to receive light scattered back once by the display screen.

It is also possible that at least one light sensor is arranged to receive light which has been reflected several times in the display screen. This allows a compact embodiment in which the display screen acts as a light conductor.

A simple and low-cost configuration is made possible, as the at least one light sensor may be a one-channel light sensor.

A method according to the invention of optically determining the position of an object which is located on an at least partially transparent display screen of an optical display and control element, comprises the following steps. A rear side of the display screen is illuminated with a time-variable light pattern. A temporal signal of the light scattered on the display screen and on the object is detected, and the position of the object is determined by temporally correlating the detected temporal signal with the time-variable light pattern. This allows detecting the position of the object due to the temporal information, whereby an elaborate two-dimensional image identification and image analysis can be dispensed with.

It is particularly simple to produce the time-variable light pattern by scanning the rear side of the display screen with a light beam.

Alternatively, it is possible to produce the time-variable light pattern through a temporal sequence of different areal light patterns.

To give an example, the temporal sequence of different areal light patterns may comprise successive light patterns which allow an iterative determination of the position.

The temporal sequence of the areal light patterns preferably proceeds so fast, in particular with at least 16 light patterns per second, that the individual light patterns can not be perceived with the naked eye.

In particular, the temporal sequence of different areal light patterns may comprise successive complementary light patterns.

It is possible that the rear side of the display screen is illuminated for producing a displayed image, preferably for the variable reproduction of information. In this way, the optical display and control element can be individually adapted and/or used for a variety of different functions.

It is possible that the time-variable light pattern is produced by a time-variable or areal modulation, preferably an amplitude modulation, of the displayed image.

It is also possible that the displayed image and the time-variable light pattern are produced in different spectral ranges.

BRIEF DESCRIPTION OF THE DRAWINGS

Further features and advantages of the invention will be apparent from the following description and the drawings to which reference is made and in which:

FIG. 3 is a front view of an optical display and control element according to a second embodiment of the invention;

FIG. 4 is a rear view of the optical display and control element according to FIG. 3;

DESCRIPTION OF EXEMPLARY EMBODIMENTS

Figure 1:
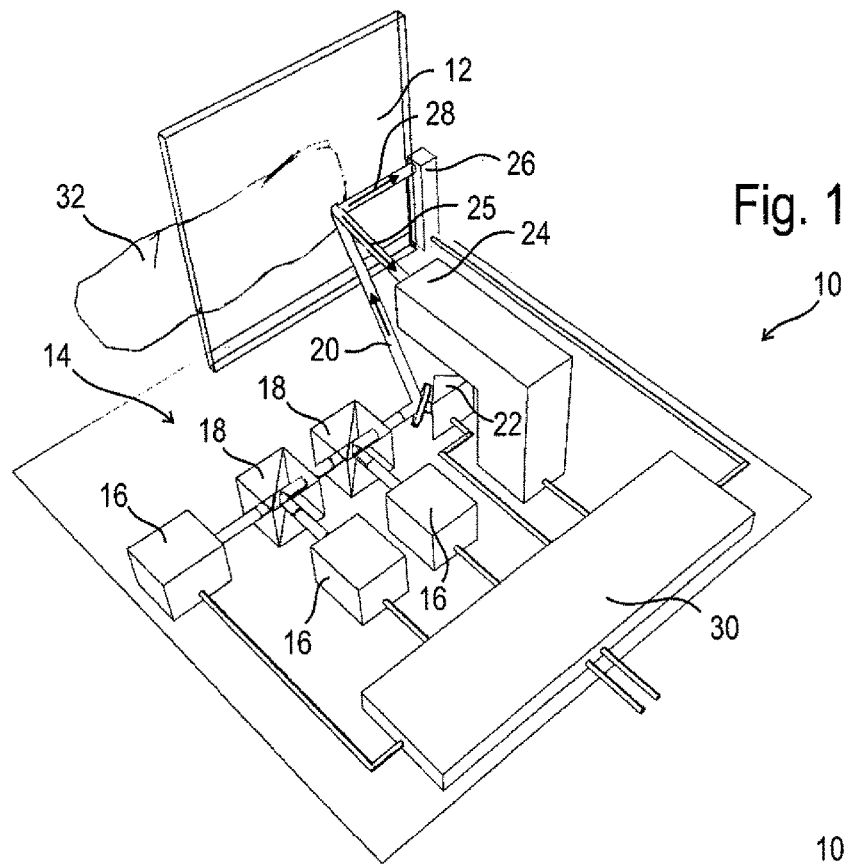
FIG. 1 is a perspective rear view of an optical display and control element according to a first embodiment of the invention.
Figure 2:
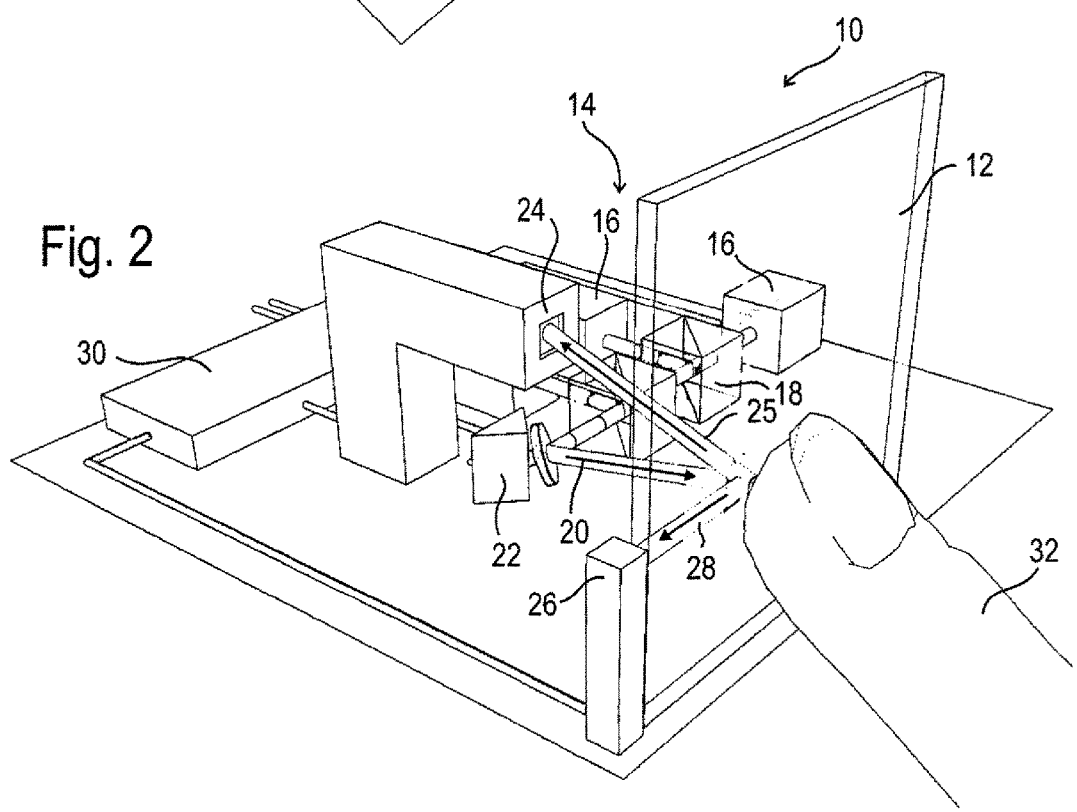
FIG. 2 is a perspective front view of the optical display and control element according to FIG. 1.

FIG. 1 and FIG. 2 show a first embodiment of an optical display and control element 10 comprising an at least partially transparent display screen 12. A light source 14 comprises three light diodes 16 of different colors, whose light is united by means of light mixers 18 so as to form a common light beam 20.

The light beam 20 is deflected to the rear side of the display screen 12 by means of a deflection unit 22. A visible displayed image 46 (cf. FIG. 7) is produced on the display screen 12 by scanning the display screen 12 line by line and a corresponding variation of the light intensity of the different light diodes 16.

Two light sensors 24 are provided which are capable of detecting light scattered on the display screen 12. A first light sensor 24 is arranged spaced away from the display screen 12 substantially in perpendicular direction in order to detect light 25 scattered once on the display screen 12.

A second light sensor 26 is arranged to the side of the display screen 12 and detects light 28 which has been multiply scattered in the display screen 12, with the display screen 12 acting as a light conductor. It is also possible that only one of the two light sensors 24, 26 is provided. The two light sensors 24, 26 each are designed as simple, one-channel light sensors.

The intensity of the scattered light 25, 28 detected by the light sensors 24, 26 is forwarded to a control and processing unit 30 as a temporal signal.

The optical display and control element 10 allows the determination of the position of an object 32 located on the display screen 12. In the first embodiment, the optical display and control element 10 is designed as a touch screen which can be operated when the display screen 12 is touched by the object 32, in the Figures a finger or alternatively a pointing device.

The position of the object 32 is determined according to the method described below. The rear side of the display screen 12 is illuminated with a time-variable light pattern which is produced by scanning the rear side of the display screen 12 with the light beam 20. Illuminating the rear side of the display screen 12 produces a displayed image on the display screen 12 which serves in particular for the variable reproduction of information, for instance of a menu control.

The light scattered on the display screen 12 is detected by the light sensors 24 in the form of a temporal signal. Thus, each point in time has a point on the display screen 12 associated to it, which is illuminated at that point in time and on which the light is scattered.

The position of the object 32 is determined by a temporal correlation of the detected temporal signal with the time-variable light pattern. In the design variant which is shown, the light beam 20 scans the entire surface area of the display screen 12 line by line. In the region of the contact point of the object 32 on the display screen 12, an altered temporal signal is detected by the light sensors 24, 26.

The control and processing unit 30 compares the temporal signal of the light sensors 24, 26 with the time-variable light pattern of the scanning light beam. If the object 32 is on the surface of the display screen 12, scattering the light on the display screen 12 is changed in this region. Thus, the position of the light beam 20 on the display screen 12 at the moment of the signal change corresponds to the position of the object 32.

The light sensors 24, 26 may be designed as one-channel light sensors, each being able to detect the entire display screen 12. Due to using the temporal information of the time-variable light signal, a two-dimensional image detection and image analysis or detecting several color channels is not necessary.

The time-variable light pattern may additionally comprise a temporal modulation; for instance, the brightness of the light beam 20, in particular even of an individual spectral component, is temporally modulated during the line-by-line scanning process, with the modulation preferably being not discernible with the naked eye.

It is also possible that the light source 14 produces light in an invisible spectral range, whereby the variable light pattern can be produced independently of a visible displayed image which is projected onto the display screen 12.

FIGS. 3 and 4 illustrate a second embodiment of the optical display and control element 10 which is designed in analogy to the first embodiment and comprises an actuating element 34 attached to the display screen 12. In the embodiment shown, the actuating element 34 is a rotary knob attached to a fixed position of the display screen 12 so as to be rotatable about a rotary axis.

On the side of the actuating element 34 facing the light source 14, an optical coding means 36 is provided, coding a position of the actuating element. In the illustration shown in FIG. 4, the optical coding means 36 is formed by two stripes extending radially from the rotary axis. Depending on the rotary position of the actuating element 34, the radially extending stripes of the optical coding means 36 have different positions on the display screen 12. It is also possible to provide another optical coding means on the actuating element 34.

The actuating element 34 comprises an integrated light conductor 38 which can be illuminated by the light source 14. The light of the light source 14 is coupled into the light conductor and can be used for illuminating and designating the control element. By illuminating the rearward end of the light conductor 38, corresponding markings of the actuating element 34 can be illuminated with any desired colors.

The method of determining the position is carried out in analogy to the first embodiment, with the object 32 to be determined being the actuating element 34, and the position of the optical coding means 36 is determined with the radially extending stripes. The position of the actuating element 34 is known from the position of the optical coding means 36.

In analogy to the first embodiment, a function as a touch screen may be provided, providing a determination of the position of a finger or pointing device on the display screen 12 in addition to determining the position of the actuating element 34.

As an alternative, the function of the display screen 12 may be limited to displaying information; in this case, the determination of the position may be spatially restricted to the area of the actuating element 34 and its optical coding means 36.

Figure 5:
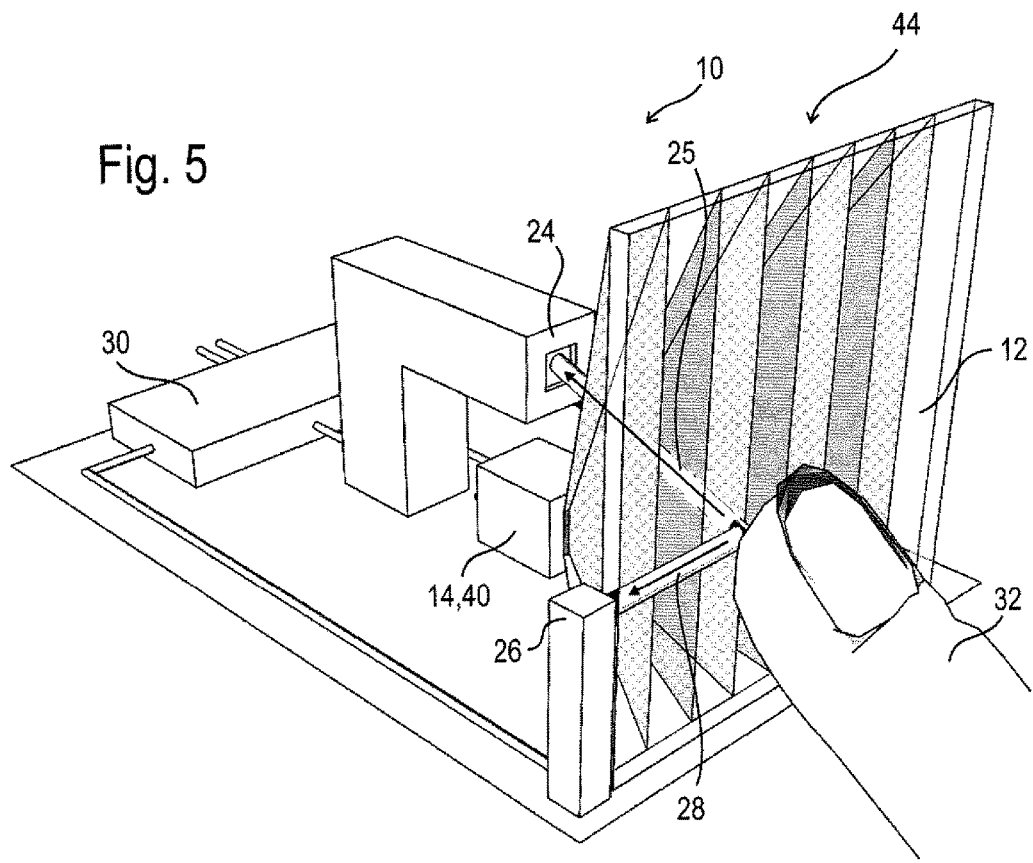
FIG. 5 is a perspective front view of an optical display and control element according to a third embodiment of the invention.

A third embodiment of an optical display and control element 10 is illustrated in FIG. 5. The light source 14 is designed as a projection unit 40 allowing an areal illumination of the display screen 12. The projection unit 40, for example, is a DLP chip projector comprising an LED light source.

The light sensors 24 and 26 are designed in analogy to the first embodiment.

The projection unit 40 is able to illuminate the display screen 12 with a temporal sequence of different areal light patterns 44, with the temporal sequence of the different areal light patterns 44 producing a time-variable light pattern for determining the position. In FIG. 5, a light pattern comprising four bright and four dark vertical stripes is projected onto the display screen 12.

Figure 6:
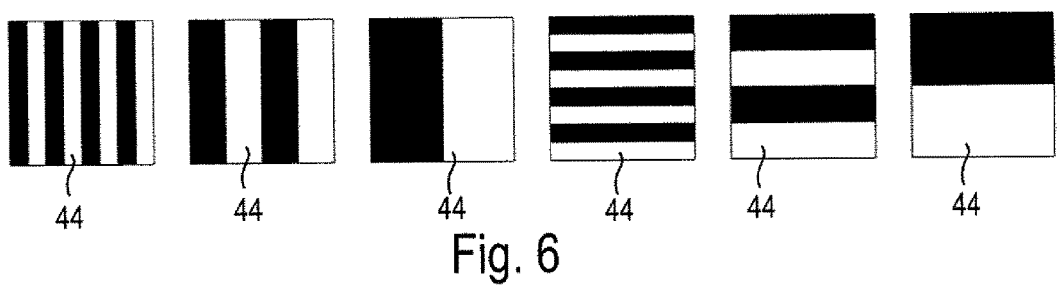
FIG. 6 shows a set of light patterns of a method according to the invention for optically determining the position.

A complete temporal sequence of the areal light patterns is illustrated in FIG. 6. The first light pattern 44 corresponds to the light pattern 44 shown in FIG. 5 with four vertical bright and dark stripes. The two subsequent light patterns 44 show two bright stripes and one bright stripe, respectively, each being twice as wide as the stripes of the preceding light pattern 44.

The subsequent three light patterns 44 similarly comprise vertically designed stripes. The complete set of the light patterns 44 allows an iterative determination of the position of the contact point of the object 32. Other patterns or other temporal sequences of the patterns are possible, too. In particular, provision is made that each light pattern 44 is followed by a projected, complementary light pattern.

Figure 7:
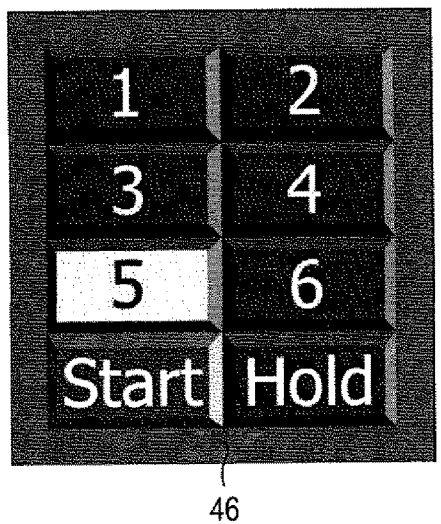
FIG. 7 is a displayed image according to a method of the invention for optically determining the position.
Figure 8:
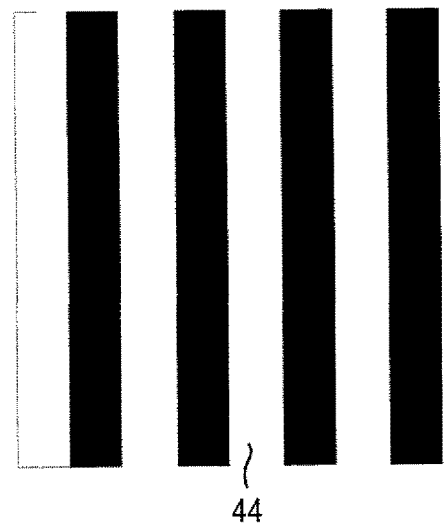
FIG. 8 shows an areal light pattern according to a method of the invention.
Figure 9:
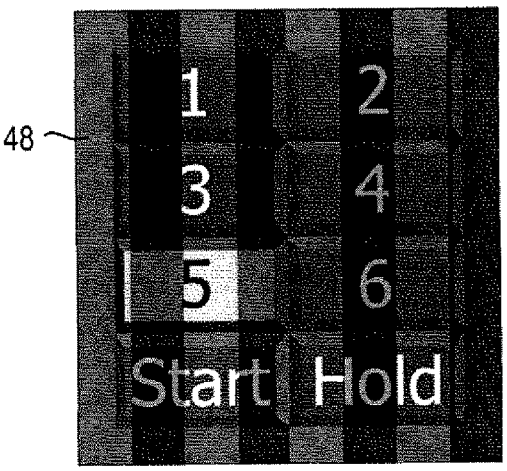
FIG. 9 shows the displayed image according to FIG. 7, modulated with the light pattern according to FIG. 8.

According to a preferred variant of the method, the displayed image 46 shown in FIG. 7 is modulated with a light pattern 44 shown in FIG. 8, from the set of light patterns 42. The modulated displayed image 48 is shown in FIG. 9.

Figure 10:
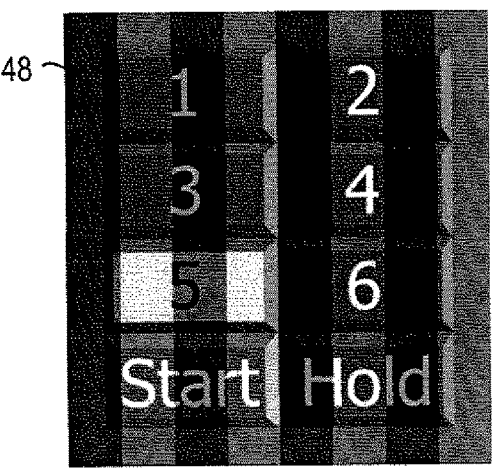
FIG. 10 shows the displayed image according to FIG. 7, modulated with a light pattern which is complementary to the light pattern according to FIG. 8.

Preferably, a further light pattern is provided in each case, which is designed so as to be complementary to a preceding light pattern; FIG. 10 shows the displayed image modulated with the complementary light pattern.

The temporal sequence of the areal light pattern proceeds so fast that the individual light patterns can not be perceived with the naked eye. To this end, the light pattern frequency is more than 16 light patterns per second. The eye averages the rapid sequence of the areal light patterns 44 to an unmodulated average value so that the sensory impression is that of the unmodulated displayed image 46 in FIG. 7.

The spacial resolution capability of the position determination method is determined in the iterative method by the number of the areal light patterns 44 in a set of light patterns 42.

In the embodiments shown, multi-color light sources 14 are provided in each case, allowing a multi-color illumination and display of the display screen 12. It is also possible, however, that a monochrome display in any desired color is provided by a correspondingly monochrome light source.

The light source 14 can produce the time-variable light pattern in an invisible spectral component, whereby the time-variable light pattern can be produced independently of the displayed image 46.

It is also possible to provide independent light sources for producing the displayed images and for producing the time-variable light pattern.

The invention claimed is:

1. An optical display and control element (10) comprising an at least partially transparent display screen (12), at least one light source (14) for illuminating a rear side of the display screen (12), and at least one light sensor (24, 26) for detecting a temporal signal of the light (25, 28) of the light source scattered on the display screen (12),
   the light source (14) being designed so as to be able to produce a time-variable light pattern while illuminating the rear side of the display screen (12), and a control and processing unit (30) is provided which is designed so as to be able to evaluate the temporal signal, detected by the light sensor (24, 26), in combination with the time-variable light pattern and to determine a position of at least one object (32) located on the display screen (12) from this evaluation;
   the at least one object including an actuating element (34) being provided which is attached to the display screen (12) so that the actuating element is rotatable about a rotary axis, the actuating element having on its side facing the light source (14) an optical coding (36) which codes a position of the actuating element (34);
   wherein the actuating element (34) comprises an integrated light conductor (38) which can be illuminated by the light source (14).

2. The optical display and control element according to claim 1, wherein at least one light sensor (24) is arranged to receive light (25) scattered back once by the display screen (12).

3. The optical display and control element according to claim 1, wherein at least one light sensor (26) is arranged to receive light (28) which has been reflected several times in the display screen (12).

4. The optical display and control element according to claim 1, wherein at least one light sensor (24), (26) is a one-channel light sensor.

5. The optical display and control element according to claim 1, wherein the actuating element is rotatable about the rotary axis relative to the display panel.

6. A method of optically determining the position of an object (32) which is located on an at least partially transparent display screen (12) of an optical display and control element (10), comprising the steps of:
   illuminating a constant area on a rear side of the display screen (12) successively with one single predetermined sequence of different areal light patterns, detecting a temporal signal of the light (25, 28) scattered on the display screen (12) and on the object for each of the areal light patterns, and determining a final position of the object (32) by temporally correlating the detected temporal signals with the related areal light patterns for all of the areal light patterns.

7. The method of claim 6, wherein the sequence of different areal light patterns consists of at least three different areal light patterns.

8. The method according to claim 6, wherein the time-variable light pattern is produced by scanning the rear side of the display screen (12) with a light beam (20).

9. The method according to claim 6, wherein the temporal sequence of the areal light pattern proceeds so fast, in particular at least 16 light patterns per second, that the individual light patterns can not be perceived with the naked eye.

10. The method according to claim 6, wherein the temporal sequence of different areal light patterns comprises successive complementary light patterns.

11. The method according to claim 6, wherein the rear side of the display screen (12) is illuminated for producing a displayed image, preferably for the variable reproduction of information.

12. The method according to claim 6, wherein the time-variable light pattern is produced by a time-variable or areal modulation, preferably an amplitude modulation, of the displayed image.

13. The method according to claim 6, wherein the displayed image and the time-variable light pattern are produced in different spectral ranges.

\* \* \* \* \*